United States Patent
Cecil et al.

[19]

[11] Patent Number: 6,067,696

[45] Date of Patent: May 30, 2000

[54] QUALITY CONTROL SYSTEM FOR A CLINCHING STATION

[75] Inventors: Dimitrios G. Cecil, 4370 Charing Way, Bloomfield Hills, Mich. 48304; John E. Nemazi, Bloomfield Hills, Mich.

[73] Assignee: Dimitrios G. Cecil, Bloomfield Hills, Mich.

[21] Appl. No.: 09/057,190

[22] Filed: Apr. 8, 1998

[51] Int. Cl.[7] .................................................. B23Q 17/00
[52] U.S. Cl. .................................. 29/407.01; 29/407.08; 29/709; 29/716; 29/798
[58] Field of Search ........................... 29/407.01, 407.08, 29/407.09, 407.1, 706, 707, 708, 709, 714, 715, 716, 798

[56] References Cited

U.S. PATENT DOCUMENTS

| | | | |
|---|---|---|---|
| Re. 35,619 | 10/1997 | Muller | 29/716 |
| 4,442,584 | 4/1984 | Smallegan | 29/716 |
| 5,339,509 | 8/1994 | Sawdon et al. | |
| 5,357,668 | 10/1994 | Roberts | 29/559 |
| 5,487,215 | 1/1996 | Ladouceur | 29/716 |
| 5,632,912 | 5/1997 | Cecil | |
| 5,657,536 | 8/1997 | Shinjo | 29/798 |
| 5,743,003 | 4/1998 | Shinjo | 29/798 |
| 5,752,305 | 5/1998 | Cotterill et al. | 29/798 |

FOREIGN PATENT DOCUMENTS

| | | | |
|---|---|---|---|
| 0100857 | 4/1990 | Japan | 29/407 |
| 2099142 | 12/1982 | United Kingdom | 29/707 |

Primary Examiner—David P. Bryant
Assistant Examiner—Jermie E. Cozart
Attorney, Agent, or Firm—Brooks & Kushman, P.C.

[57] ABSTRACT

A clinching station for securing a first workpiece to a second workpiece includes control logic receiving a punch position sensor output and processing the punch position sensor output and an established position signature to generate a clinching operation status signal. The clinching station includes a punch and die assembly including a punch and a die mounted opposite each other for movement relative to each other along a working axis. A position sensor is configured to monitor the position of the punch relative to the die, and has an output indicative of the position of the punch relative to the die. The established position signature corresponds to an acceptable clinching operation, and allows the control logic to generate the clinching operation status signal.

28 Claims, 6 Drawing Sheets

QUALITY CONTROL SYSTEM FOR A CLINCHING STATION

TECHNICAL FIELD

The present invention relates to quality control systems for clinching stations.

BACKGROUND ART

The use of clinch joints to secure a first workpiece to a second workpiece is becoming widespread. For example, clinch joints are commonly used to secure two pieces of sheet metal together. A typical clinching station includes a punch and die assembly including a punch and a die mounted opposite each other for movement relative to each other. The two sheet metal pieces to be clinched are placed in overlapping engagement between the punch and the die. A fluid powered cylinder drives the punch into the workpieces, deforming the workpieces into interlocking engagement with each other.

A clinching station may also be used to clinch a nut or a bolt to a piece of sheet metal. The resulting part is a piece of sheet metal having either a nut or a bolt secured thereto. The sheet metal is then used to build a desired product, with the secured nut or bolt facilitating assembly of the end product.

Although existing clinching stations and clinching methods have been commercially successful, sometimes, the formed clinch joints are defective. For example, if the parts to be clinched do not overlap at the location of punch impact, the punch will only deform one of the parts and fail to form an effective clinch joint. An other potential problem associated with existing clinching stations is a possibility that more than two parts are located in the region of punch impact.

In particular, when securing nuts to a piece of sheet metal, sometimes the nutfeeder may inadvertently place two nuts at the punch. When the punch is driven toward the die, the presence of the two nuts instead of one results in a defective clinching operation. Further, sometimes the nutfeeder may fail to place a nut at the punch, resulting in a defective clinching operation.

SUMMARY OF THE INVENTION

It is, therefore, an object of the present invention to provide a clinching station and clinching method for securing a first workpiece to a second workpiece having control logic that generates a clinching operation status signal to indicate part faults.

In carrying out the above object and other objects and features of the present invention, a clinching station for sec u ring a first workpiece to a second workpiece is provided. The clinching station comprises a punch and die assembly including a punch and a die mounted opposite each other for movement relative to each other along a working axis. A position sensor is configured to monitor a position of the punch relative to the die. The position sensor has an output indicative of the position of the punch relative to the die. Control logic receives the position sensor output. The control logic processes the position sensor output and an established position sensor output signature to generate a clinching operation status signal.

In one embodiment, the position sensor output at maximum punch travel during clinching is compared to the position sensor output signature to generate the clinching operation status signal. A good clinch condition is indicated when the maximum punch travel corresponds to the position sensor output signature. A fault condition is indicated when the maximum punch travel does not correspond to the position sensor output signature. Preferably, a no-part fault is indicated when the position sensor output at maximum punch travel exceeds an acceptable maximum punch travel range defined by the position sensor output signature. Preferably, an extra-part fault is indicated when the position sensor output at maximum punch travel precedes the acceptable maximum punch travel range.

In another embodiment, control logic determines at least one time derivative of the punch position relative to the die. The control logic processes the position sensor output, the at least one time derivative, and the position sensor output signature. A good clinch condition is indicated when the position sensor output and the at least one time derivative correspond to the position sensor output signature. A fault condition is indicated when the position sensor output and the at least one time derivative do not correspond to the position sensor output signature. Preferably, the at least one time derivative includes acceleration of the punch relative to the die.

Further, in carrying out the present invention, a method of clinching a first workpiece to a second workpiece is provided. The method comprises establishing a position signature for the punch relative to the die during an acceptable clinching operation, and monitoring the position of the punch relative to the die during a clinching operation. The method further comprises processing the position of the punch relative to the die, and the position signature to generate a clinching operation status signal.

Still further, in carrying out the present invention, a clinching station comprising a punch and die assembly, a position sensor, a load sensor, and control logic is provided. The position sensor is configured to monitor position of the punch relative to the die, and has an output indicative of the position of the punch relative to the die. The load sensor is configured to monitor loading experience by the punch and die assembly, and has an output indicative of the punch and die assembly load. The control logic receives the position sensor output and the load sensor output. The control logic processes the position sensor output, the load sensor output, a load threshold, and a predetermined acceptable position range for initiating clinching of the first workpiece to the second workpiece to generate a clinching operation status signal.

In a preferred embodiment, control logic generates a no-part fault signal indicative of a no-part fault condition if the position of the punch relative to the die exceeds the acceptable position range for initiating clinching of the first workpiece to the second workpiece without the load exceeding the load threshold. Further, in a preferred embodiment, control logic generates a part fault signal indicative of a part fault condition if the punch and die assembly load exceeds the load threshold while the position of the punch relative to the die is outside of the predetermined acceptable position range for initiating clinching.

Still further, in carrying out the present invention, a method of clinching a first workpiece to a second workpiece with a punch and die assembly is provided. The method comprises determining an acceptable position range for initiating clinching, monitoring the position of the punch relative to the die, determining a load threshold wherein loads experienced by the punch and die assembly exceeding the load threshold cause clinching of the first workpiece to the second workpiece, and monitoring the loading experienced by the punch and die assembly. The method further comprises processing the position of the punch relative to the die, the loading experienced by the punch and die assembly, the load threshold, and the acceptable position range for initiating clinching to generate a clinching operation status signal.

The advantages associated with embodiments of the present invention are numerous. For example, embodiments of the present invention employ control logic for generating a clinching operation status signal. The operation status signal may be determined from a position sensor output and an established position sensor output signature, or from a position sensor output and a load sensor output. Further, a variety of different sensing techniques may be employed for determining position and/or loading. Still further, a variety of different signature techniques may be employed for establishing the position signature, which may optionally include loading information, if desired.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
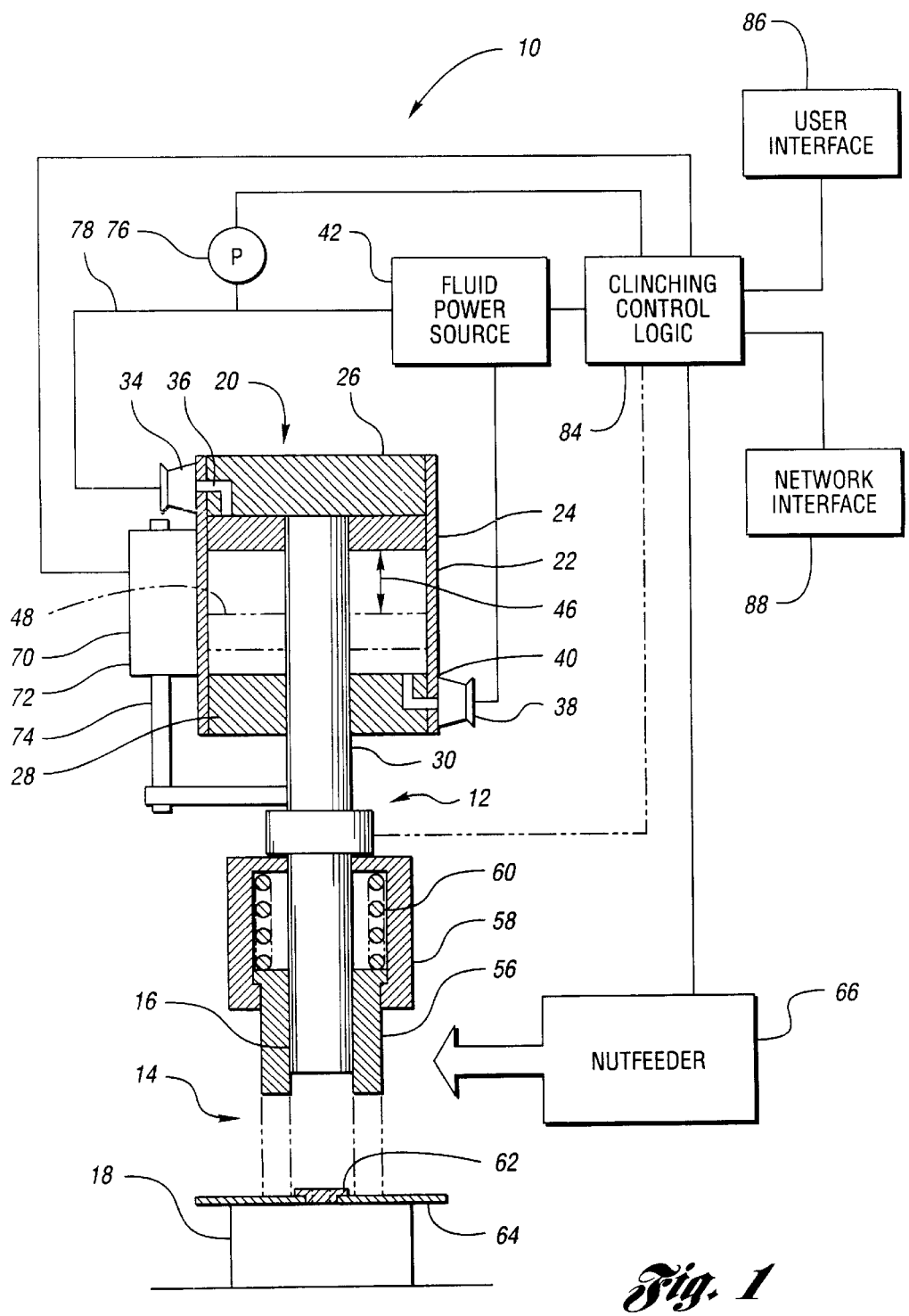
FIG. 1 is a clinching station of the present invention, showing the clinching apparatus and a fluid power source coupled to clinching control logic.

With reference to FIG. 1, a clinching station made in accordance with the present invention is generally indicated at 10. Clinching station 10 includes a clinching apparatus 12. Clinching apparatus 12 has a punch and die assembly 14 including a punch 16 and a die 18. Punch 16 and die 18 are mounted opposite each other for movement relative to each other along a working axis. A piston and cylinder assembly 20 is drivingly connected to punch and die assembly 14. Piston and cylinder assembly 20 is shown as a hydraulic cylinder 22 and associated piston 24.

Piston 24 is moveable between upper end plate 26 and lower end plate 28. Upper end plate 26 has a connector 34 and an associated conduit 36. Lower end plate 28 has a connector 38 and an associated conduit 40. The connectors 34 and 38 are for connecting to a conventional fluid power source 42. It is to be appreciated that piston cylinder assembly 20 is one example of a driving mechanism connectable to punch and die assembly 14. For example, depending on the demands placed on the clinching station, an air over oil system in which an air cylinder drives a hydraulic cylinder which drives the punch and drive assembly, or any other driving mechanism contemplated may be suitable for use in clinching station 10.

Arrow 46 indicates movement of piston 24 upon demand, with an extended position of piston 24 indicated in phantom at 48. Preferably, piston 24 never reaches a completely extended position to abut lower end plate 28 so that forces at punch and die assembly 14 are not diminished. Punch and die assembly 14, in addition to punch 16 and die 18, generally includes an stripper die 56 slidably received in a retainer 58. Upon actuation of punch and die assembly 14, stripper die 56 slides within retainer 58 against the bias of spring 60 to allow clinching. As shown, a first workpiece such as clinch nut 62 is secured to a second workpiece such as sheet material 64. Nuts 62 are received at punch 16 from nutfeeder 66. Of course, embodiments of the present invention may be employed in clinching stations for clinching operations other than nuts and sheet material. For example, sheet to sheet clinching and sheet to bolt clinching may be conducted in accordance with embodiments of the present invention. Interlocking of fasteners, such as nuts and bolts, to sheet material is described in U.S. Pat. No. 5,339,509, issued to Sawdon et al., which is hereby incorporated by reference in its entirety.

In the embodiment of the present invention illustrated in FIG. 1, a position sensor 70 is configured to monitor position of punch 16 relative to die 18. Position sensor 70 has an output indicative of the position of punch 16 relative to die 18. Position sensor 70 preferably is a linear displacement transducer having a housing 72 and an axially moveable shaft 74 connected to piston rod 30. One example of an appropriate linear displacement transducer is the linear variable displacement transformer (LVDT). Of course, other sensing configurations may be employed by one of ordinary skill in the art for different embodiments of the present invention.

A load sensor is configured to monitor loading experienced by punching and die assembly 14. The load sensor has an output indicative of the punch and die axial load. Preferably, the load sensor is a pressure transducer 76 coupled to the fluid power source inlet line 78. Alternatively, the load sensor is a load cell 80 configured to receive a component of the punch and die assembly load, which may be affixed between piston rod 30 and punch 16. Further in the alternative, a load sensor may be positioned at die 18. Of course, it is to be appreciated that there are various configurations for both the position sensor and the load sensor that could achieve the desired results of monitoring punch position and punch and die assembly loading, respectively.

Clinching control logic 84 which is executed by an industrial PC or a Programmable Logic Controller (PLC) communicates with fluid power source 42 and nutfeeder 66 to control clinching operations using standard input/output cards. Clinching control logic 84 preferably receives loading information from pressure transducer 76, or from load cell 80 in the alternative. Further, clinching control logic 84 receives position information from position sensor 70.

Clinching control logic 84 processes the position sensor output and the load sensor output to generate a fault signal, when a fault condition is present. One example of a fault condition is when the punch and die assembly load exceeds a load threshold while the position of the punch relative to the die is outside of a predetermined acceptable position range for initiating clinching.

If desired, a PC executing clinching control logic 84 may be coupled to a user interface 86 and/or a network interface 88. User interface 86 and network interface 88 allow programing of clinching control logic 84 to specify parameters for determining when a fault condition is present based on one or more of the sensor outputs.

Figure 2:
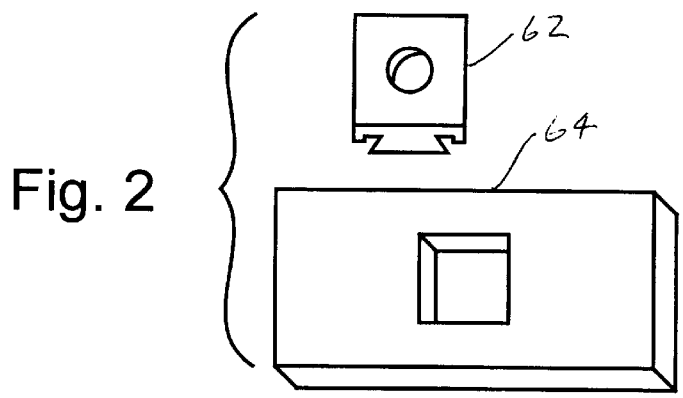
FIG. 2 is a nut and a piece of sheet material, before clinching.

With reference to FIGS. 1 and 2, as best shown in FIG. 2, nut 62 is shaped to abut sheet material 64 such that upon clinching, nut 62 and sheet material 64 deform to secure nut 62 to sheet material 64. The deformed interlocked nut and sheet material are best shown in FIG. 1.

Figure 3:
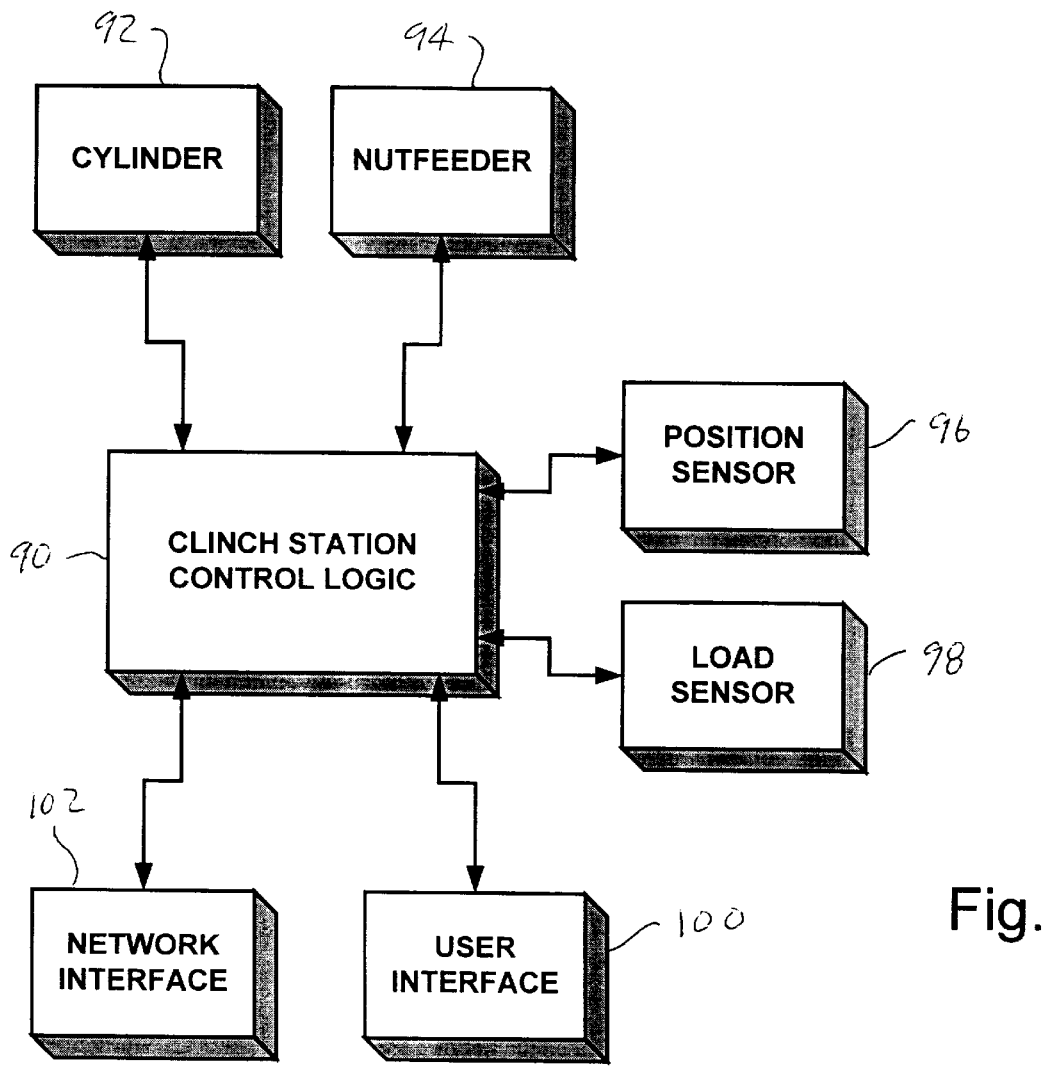
FIG. 3 is a system block diagram of the present invention, showing the use of a position sensor and a load sensor in conjunction with the clinch station control logic.

With reference to FIG. 3, a general system block diagram illustrating clinching station 10 of FIG. 1, includes clinch station control logic 90. Clinch station control logic 90 controls cylinder 92 and nut feeder 94 to place a nut on sheet material, and then clinch the nut to form a clinched joint. Clinching station control logic 90 monitors output from position sensor 96 and load sensor 98 so that actuation of cylinder 92 may optionally be halted when it is realized that a fault condition exists. User interface 100 and network interface 102 may be used to program clinch station control logic 90, as desired.

Figure 4:
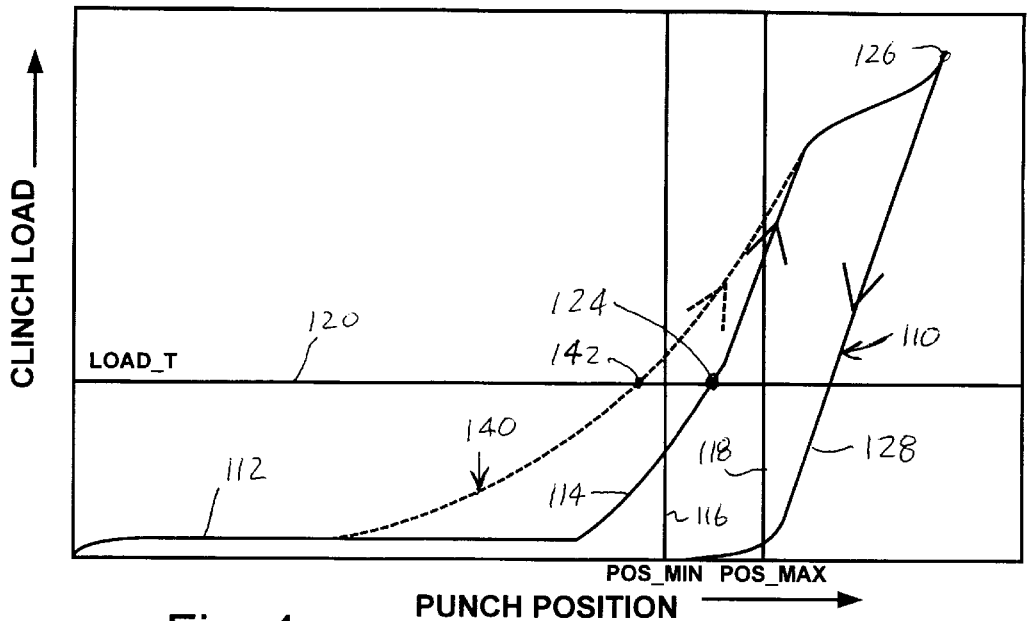
FIG. 4 is a graph depicting clinch load versus punch position for the clinching station shown in FIG. 1, illustrating a good clinch operation in solid line, and a bad clinch operation in short dashed line.

Referring to FIG. 4, a graph depicts clinch load versus punch position for an embodiment of the present invention utilizing a position sensor and a load sensor to control clinching operations. The forming of a good clinch joint is shown in solid line, and is generally indicated at 110. Graph portion 112 shows a low load on the punch as the punch approaches the die. Graph portion 114 shows steadily increasing load after engagement of the punch and die assembly with the workpieces, and the workpieces with each other. The workpieces, such as a nut and sheet material (or two pieces of sheet material, ect.) have successfully formed a clinch joint at point 126 on graph 110. Thereafter, load experienced by the punch and die assembly generally decreases along graph portion 118 until the punch and die assembly has again returned to the open position. A next successful clinching operation would again follow a load versus punch position graph similar to graph 110 in shape and orientation.

Sometimes during clinching of a nut into an aperture formed in a sheet metal panel (FIG. 2), the workpieces may be misaligned with respect to each other. The clinching of such workpieces would result in an inferior clinch joint. A representative graph of what could happen to such misaligned parts, if clinched, is generally indicated at 140. Clinch load would increase along the path of dashed line 140 until point 142. Embodiments of the present invention signal a fault condition when clinch load exceeds the load threshold 120 while the punch position is outside of a predetermined acceptable position range for initiating clinching. The predetermined acceptable position range for clinching initiation is defined by a lower bound (minimum position) 116 and an upper bound (maximum position) 118. Accordingly, because the misaligned parts will reach a clinch load of the load threshold 120 before the punch position is in the acceptable position range for clinching initiation, the clinching control logic may immediately halt the clinching operation.

Alternatively, the clinching operation may be allowed to complete, and the clinching control logic records sufficient information to identify an operator that the part is faulty. For example, the clinching control logic may turn on an indicator light to alert an operator of the faulty part, or may record part identifying information in a failed part log. The fault log may then be made available to an operator to identify all failed parts from the clinching station.

Figure 5:
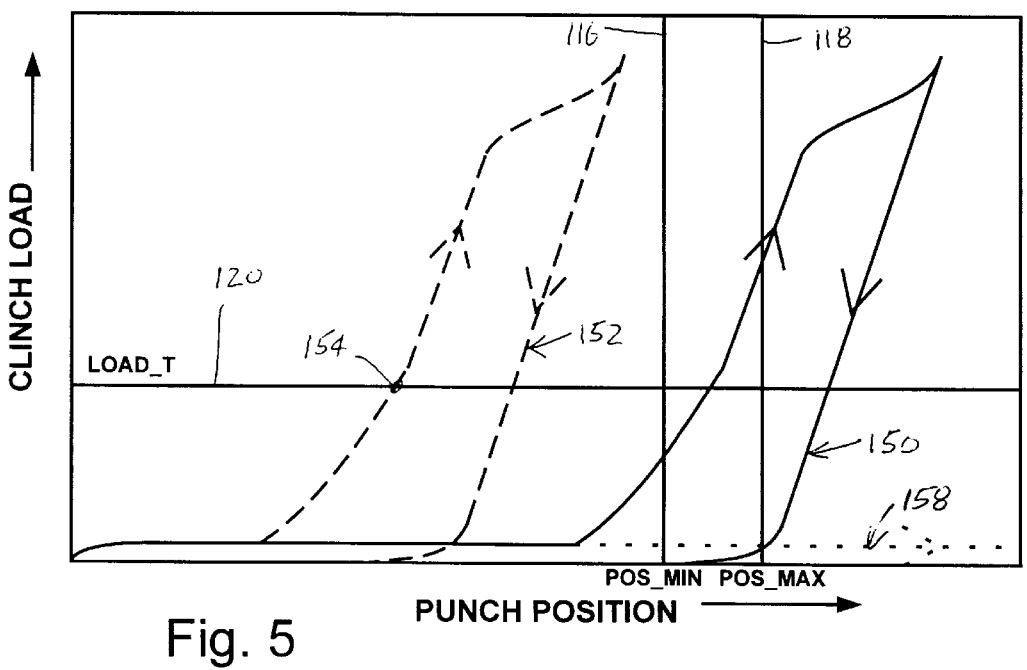
FIG. 5 is a graph depicting clinch load versus punch position for the clinching station shown in FIG. 1, illustrating a good clinch operation in solid line, bad clinch operations in long dashed line and dotted line.

Referring to FIG. 5, a graph depicting clinch load versus punch position is illustrated. A good clinch joint formation is indicated generally at graph 150 in solid line. Sometimes, particularly in nut to sheet material clinching, more than one nut is accidentally placed at the punch by the nutfeeder. For example, the nutfeeder may inadvertently place two nuts at the punch before clinching. Driving the punch and die assembly with two nuts loaded for clinching will create a faulty part. A graph of clinch load verus punch position when extra, such as two, nuts are loaded at the punch is generally indicated at 152 in long dashed line. In a manner similar to that described above with reference to FIG. 4, clinch load exceeds load threshold 120 at point 154. Because the punch position is not yet within the acceptable range defined by lower position bound 116 and upper position bound 118, clinching may be immediately halted by the clinching control logic. Alternatively, the clinching operation may continue, with the fault information being indicated to an operator in an appropriate manner such as an indicator light or fault log.

Other times, prior to initiation of clinching, only one workpiece is properly positioned between the punch and the die. For example, a piece of sheet material may be properly positioned on the die, while the other piece of sheet material or the nut is missing. Still further, no workpieces may be positioned between the punch and the die, that is, both workpieces are missing. A graph depicting clinch load versus punch position wherein for example, the nutfeeder failed to supply a nut, is generally indicated at 158 in dotted line. As the punch advances beyond lower position bound 116 and then beyond upper position bound 118 without the clinch load ever exceeding load threshold line 120, a fault condition is indicated by the clinch control logic. That is, a no-part fault signal indicative of a no-part fault condition is generated if the position of the punch relative to the die exceeds the acceptable position range for initiating clinching of the first workpiece to the second workpiece without the load exceeding the load threshold.

Figure 6:
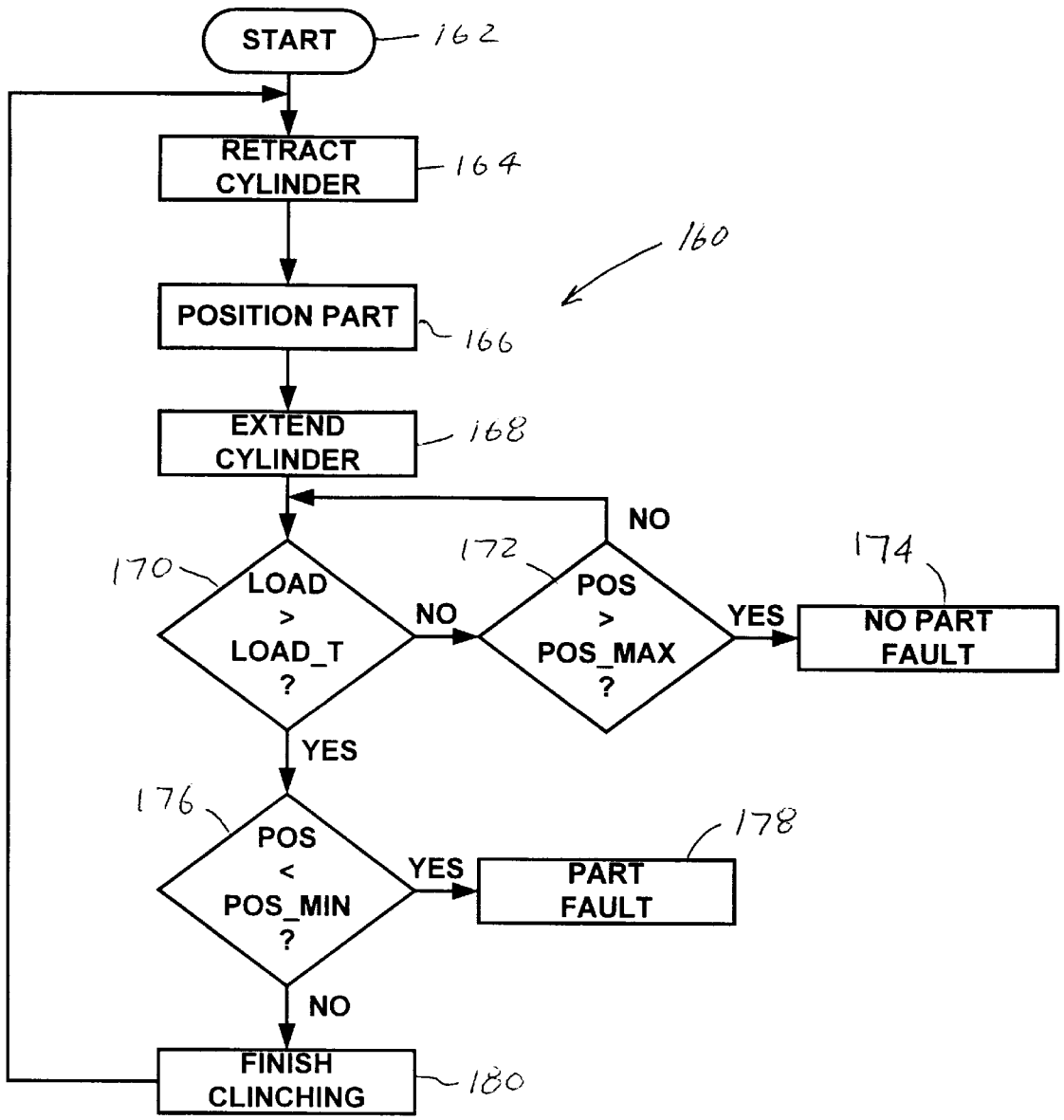
FIG. 6 is a flow chart illustrating a preferred operation mode for the clinching station shown in FIG. 1.

With reference to FIG. 6, a flow chart illustrating a method of the present invention corresponding to the graph shown in FIGS. 4 and 5 is generally indicated at 160. A clinching operation starts at start block 162. If not already retracted, the cylinder is retracted at block 164. At block 166, parts, such as a nut and a piece of sheet material, are positioned between the punch and the die. At block 168 the cylinder is extended. At decision block 170, clinch load is monitored by the clinching control logic. If the clinch load does not exceed the load threshold, process flow continues to decision block 172. At block 172, the punch position is compared to the maximum position at which the threshold load should be exceeded to form an acceptable clinch joint. If the punch position has exceeded the maximum position, while the load has remained below the load threshold, a no-part fault is indicated at block 174. If the punch position has not yet exceeded the maximum acceptable position, monitoring of the clinch load continues at block 170. When the clinch load exceeds the load threshold prior to the punch position exceeding the maximum punch position, process flow continues to decision block 176.

At block 176, punch position is compared to the minimum position at which the clinch load should exceed the load threshold in order to form a good clinch joint. If the punch position has not yet exceeded the minimum position, while the load has already exceeded the load threshold, a part fault is indicated at block 178. If the outcome of decision block 176 is that the punch position has exceeded the minimum position, Clinching is finished at block 180. Thereafter, process flow returns to block 164 and the cylinder is retracted.

A no-part fault, as indicated at block 174, is best shown in FIG. 5 at dotted line 158. A part fault, as indicated at block 178, is shown in FIG. 4 in short dashed line 140 at point 142, and in FIG. 5 at long dashed line 152 at point 154. Of course, it is preferred to halt clinching when a fault condition occurs; but, alternatively other steps such as recordal to a fault log may be taken.

Figure 7:
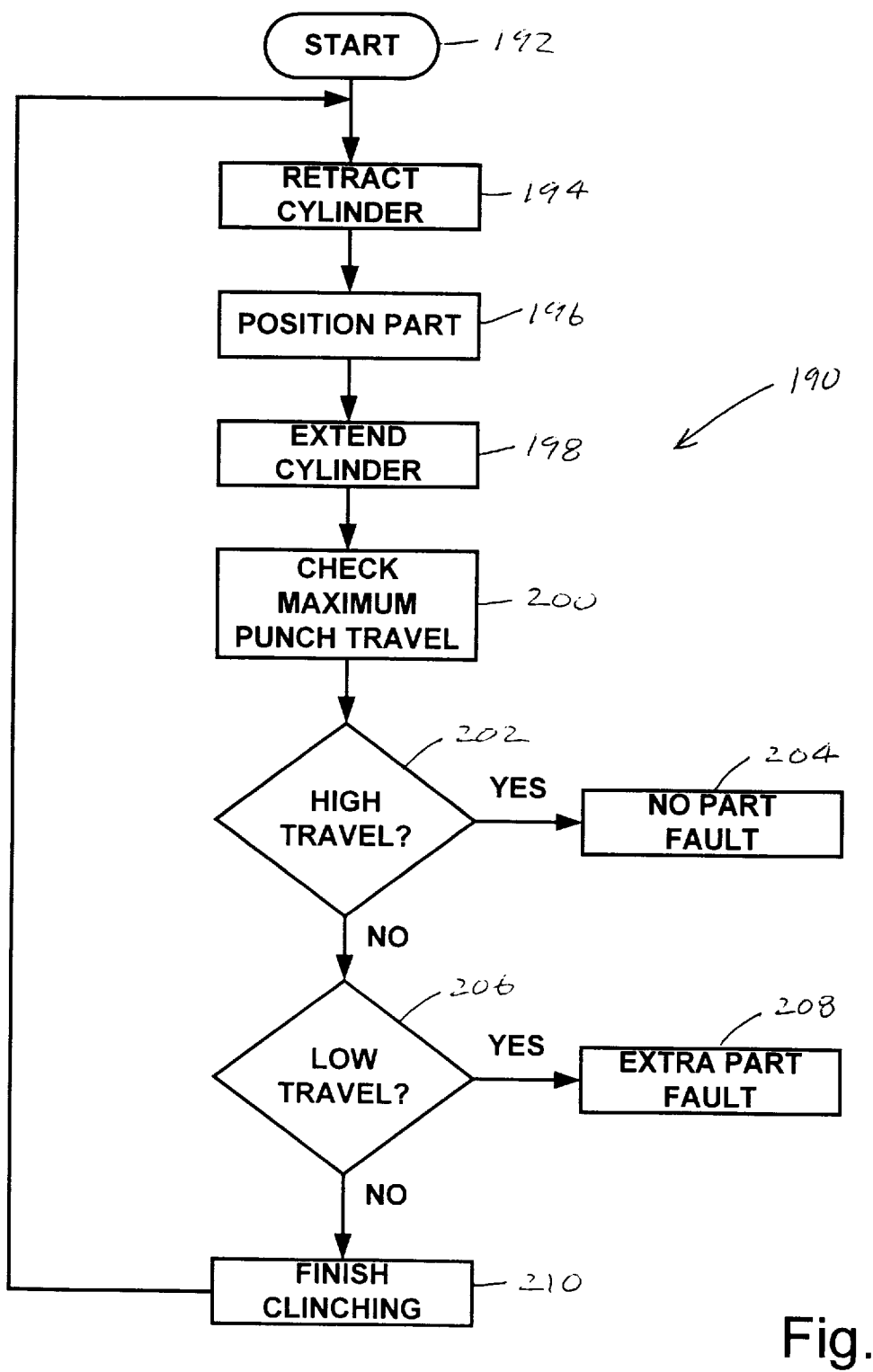
FIG. 7 is a flow chart illustrating an alternative mode of operating a clinching station in accordance with the present invention, in which a load sensor is not required.

With reference to FIG. 7, an alternative embodiment of the present invention is illustrated as a flow diagram generally indicated at 190. The clinching formation starts at start block 192. At block 194, the cylinder is retracted, if not retracted already. At block 196, parts are positioned between the punch and the die. At block 198 the cylinder is extended. The cylinder is extended to the maximum punch travel as limited, for example, by a pressure regulator in the cylinder actuation line. When the punch has reached the maximum punch travel position due to reaction forces opposing the extending of the piston rod, the maximum punch travel is checked at block 200. In this alternative embodiment of the present invention, a position sensor is the only sensor that is required. The maximum punch travel position, as indicated by the position sensor, is compared to an established position signature for the punch relative to the die during an acceptable clinching operation.

The position signature may be a position range within which maximum punch travel must fall in order for a reliable clinch joint to be expected. When the position signature includes a maximum punch travel acceptable range, the maximum punch travel is compared to this maximum punch travel acceptable range. At decision block 202, high punch or travel in excess of the upper limits of the acceptable travel range indicates a no-part fault at block 204. That is, the punch has reached an excessively large maximum travel because a missing workpiece resulted in reduced reaction forces against the punch.

If the maximum punch or travel is found to be less than the upper limit of the acceptable range defined by the position signature, decision block 206 checks for excessively low maximum punch travel. If the maximum punch travel precedes the punch travel lower limit, an extra part fault is indicated at block 208. That is, extra parts, such as two or more nuts instead of one nut in a nut clinching operation, results in early buildup of reaction forces from the workpieces on the punch causing maximum punch or travel to be reduced.

If the maximum punch or travel is found to be within the acceptable range as defined by the position signature, clinching is finished at block 210. Because this embodiment of the present invention only requires a position sensor, part faults are determined according to maximum punch travel and defective parts are marked or logged or disposed, as desired.

Figure 8:
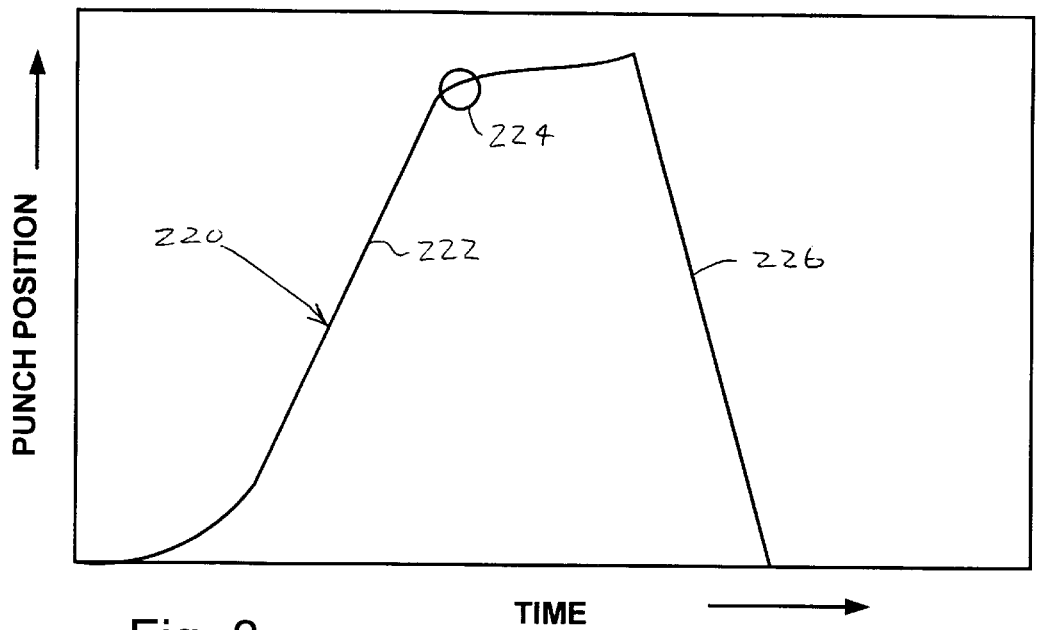
FIG. 8 is a graph depicting punch position versus time for a clinching operation.
Figure 9:
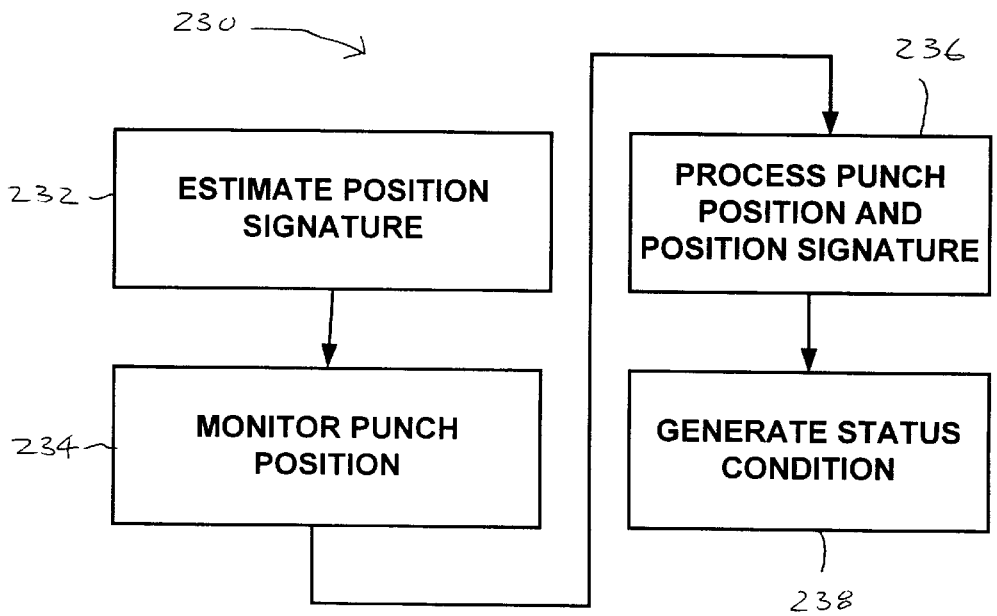
FIG. 9 is a block diagram illustrating another alternative mode for operating a clinching station in accordance with the present invention.
Figure 1:
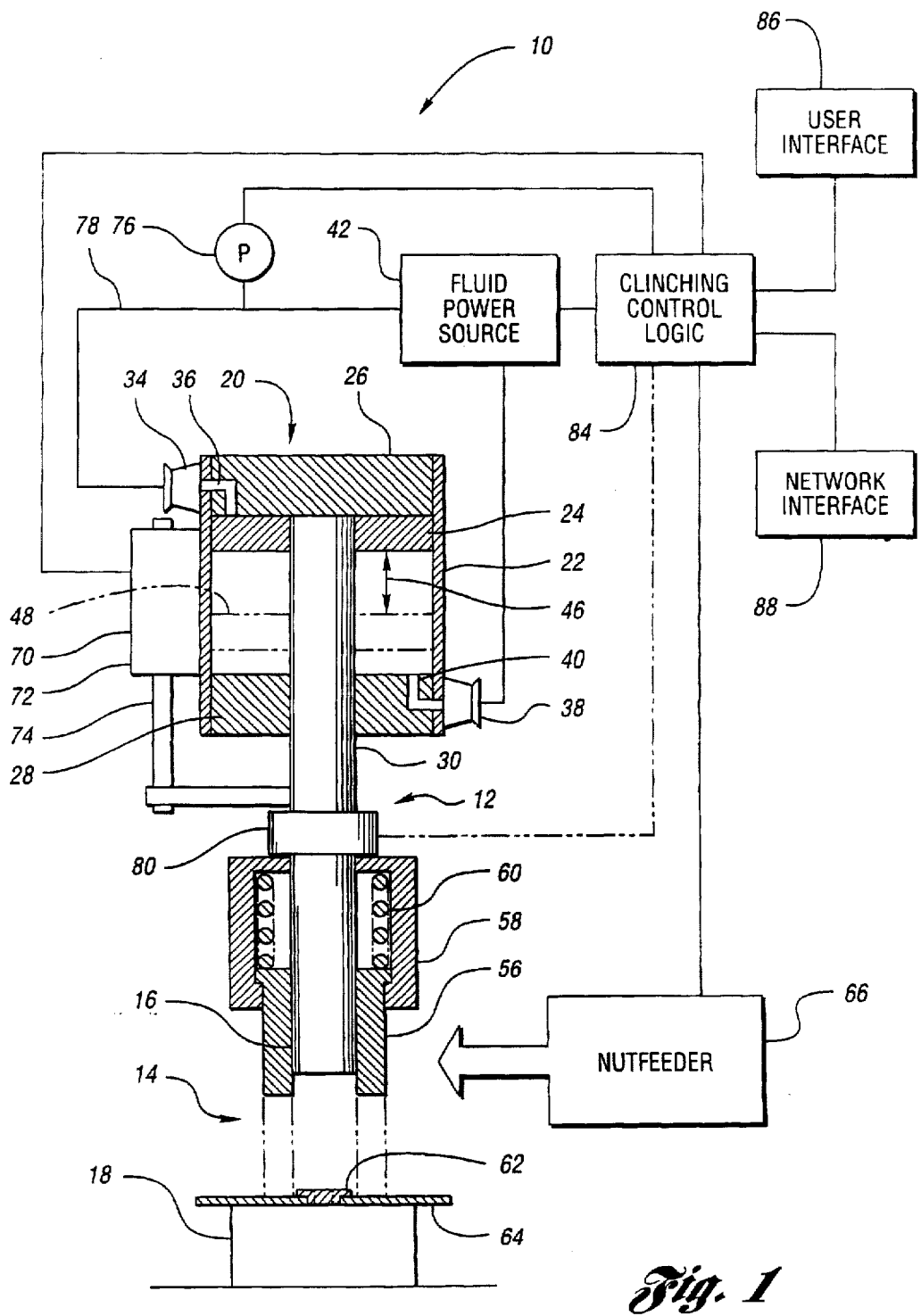
Figure 2:
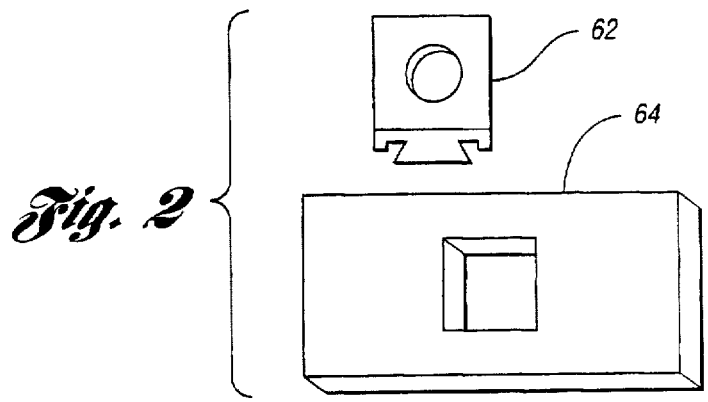
Figure 3:
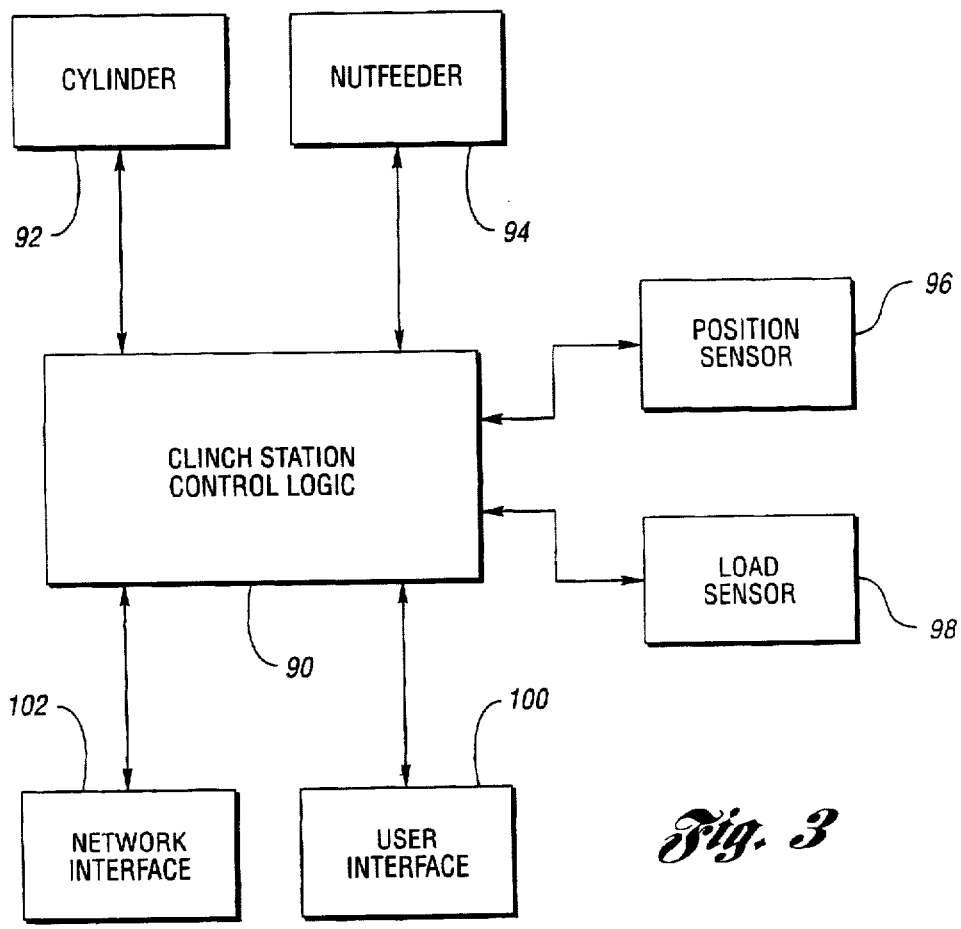
Figure 4:
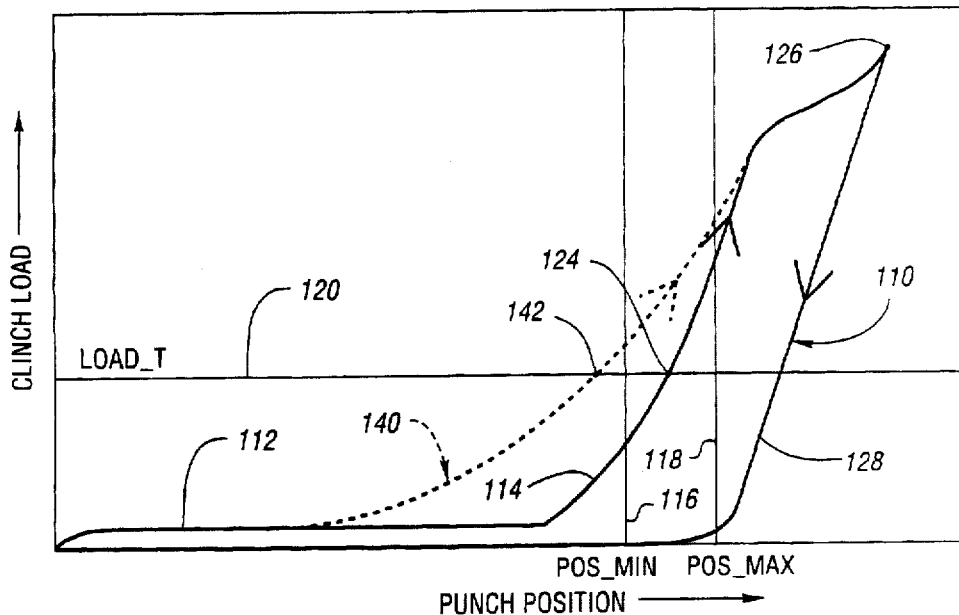
Figure 5:
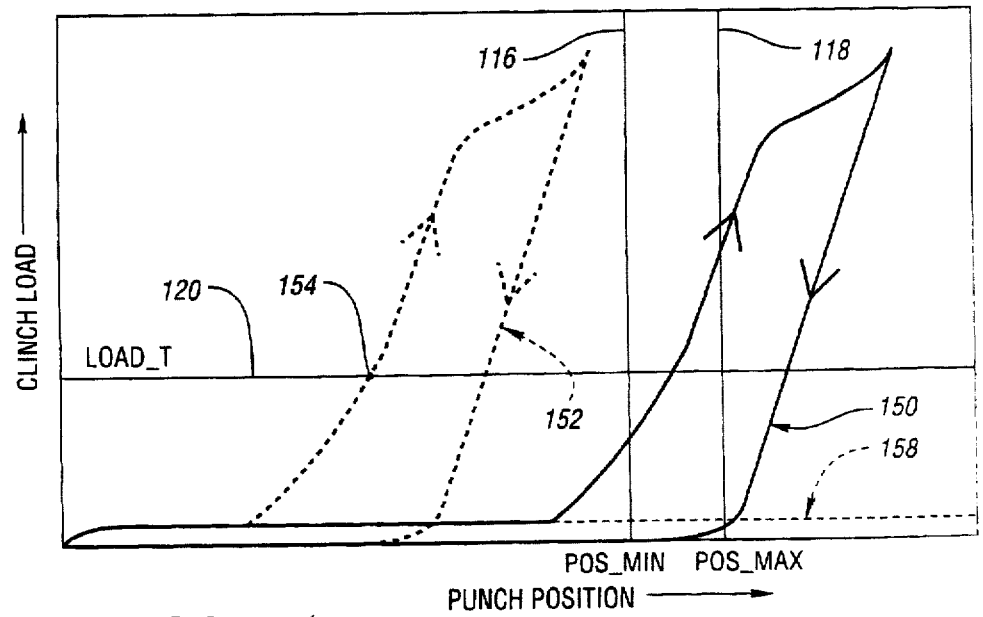
Figure 6:
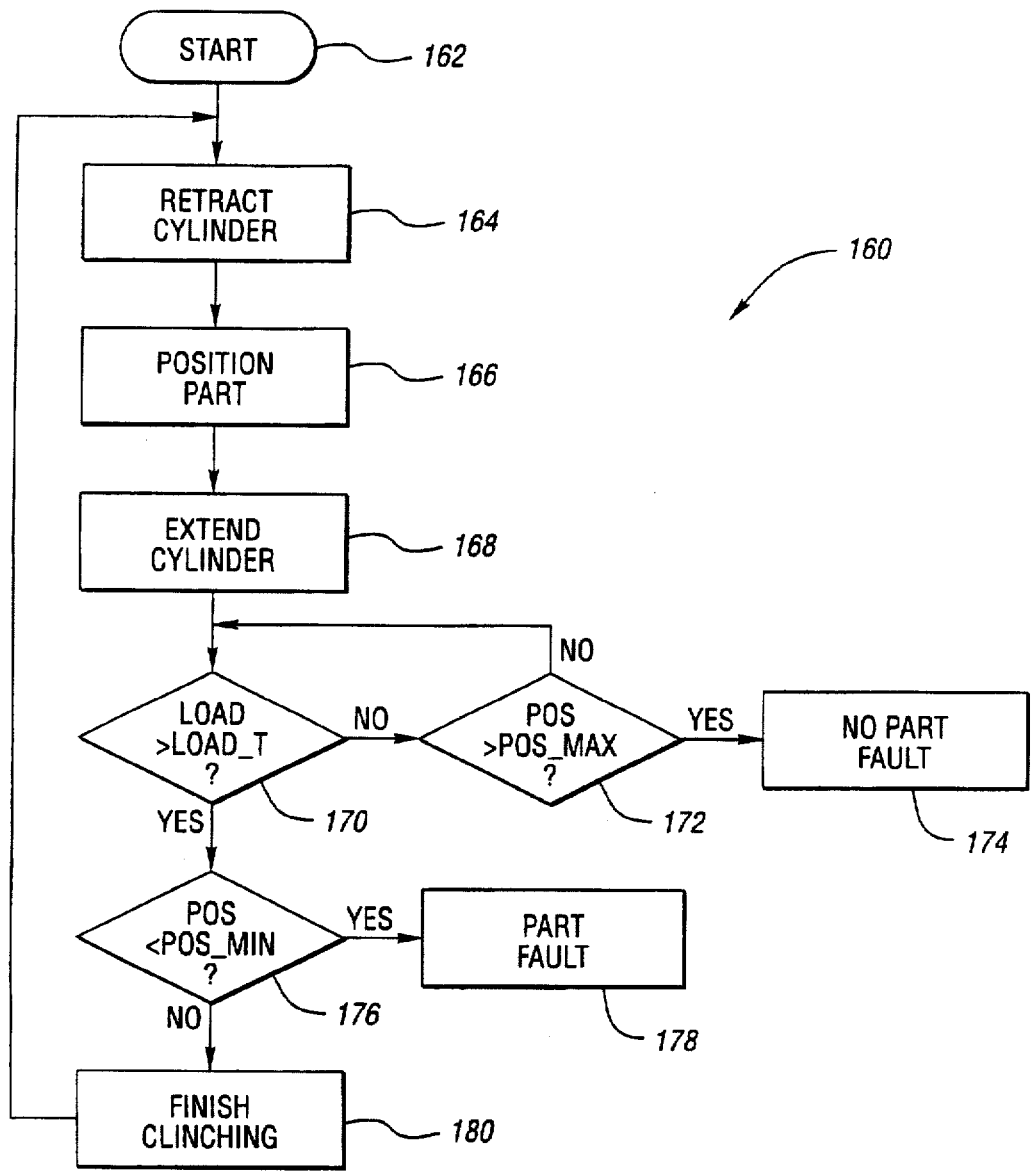
Figure 7:
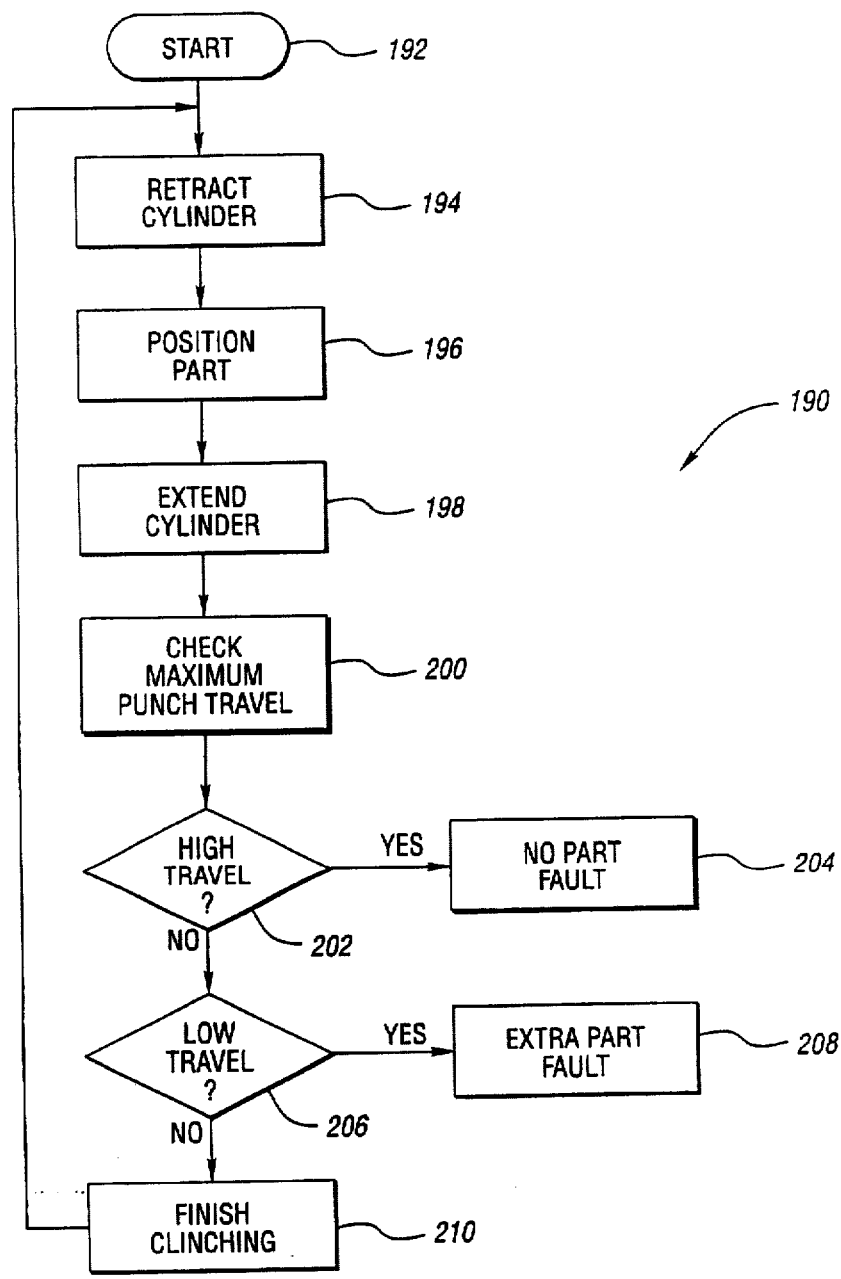
Figure 8:
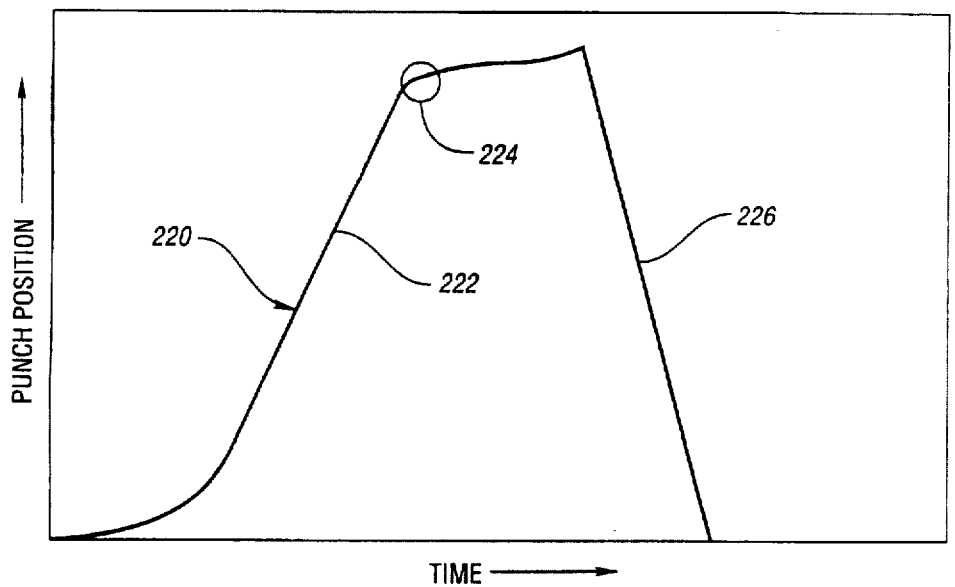
Figure 9:
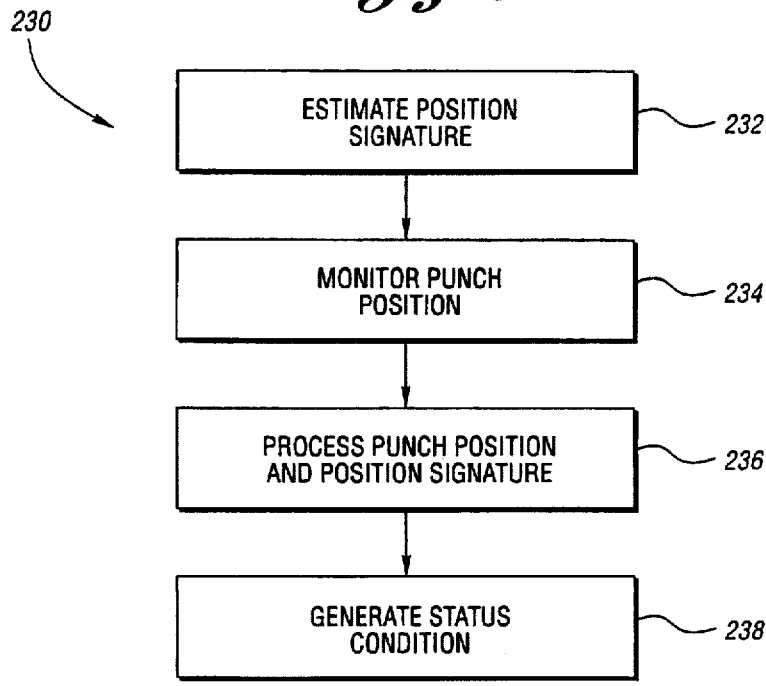

With reference to FIGS. 8 and 9, another alternative embodiment of the present invention which only requires a position sensor to monitor and control clinching operations is illustrated. FIG. 8 is a graph depicting punch position versus time during a clinching operation. Graph 220 has a clinching initiation portion 222 during which the punch rapidly advances toward the workpieces. At graph portion 224, the rate of change of punch position decreases as the punch and die assembly closes on the workpieces. After clinching, the punch retracts as depicted along graph portion 226.

With reference to FIG. 9, a clinching method associated with the graph depicted in FIG. 8 is generally indicated at 230. At block 232, a position signature for the punch relative to the die during an acceptable punching operation is established. A position signature may be a range of acceptable maximum punch travel (for embodiments such as that described in FIG. 6), or may be a more complex position signature that includes information relating to punch position behavior in a region near initial workpiece contact region 224 (FIG. 8). With continuing reference to FIG. 9, at block 234, punch position is monitored during the clinching operation. At block 236, punch position and punch position signature are processed to generate a clinching operation status condition.

In one embodiment, clinching control logic may monitor the punch position for the initial contact of the punch with the workpieces (region 224, FIG. 8). When the clinching control logic determines that initial contact of the punch and die with the workpieces has been made based on position signature information, the clinching control logic checks the punch position. If the punch position is excessively far away from the die, clinching may be immediately halted and an extra workpiece fault indicated. If the punch position is excessively close to the die when initial contact region 224 is detected, clinching may be halted and a no-part fault indicated. At block 238, status conditions are generated. The status conditions may be any of those described above, or any other status condition that would be apparent to one of ordinary skill in the art from the description herein.

In one embodiment, the punch position signature includes information relating to the acceleration of the punch relative to the die. In particular, the acceleration trend of the punch relative to the die in initial contact region 224 is preferably contained within the position signature in such an embodiment. The clinching control logic monitors the punch position, and determines the punch acceleration preferably from the punch position information. The clinching control logic determines initial contact of the punch and die with the workpieces when the punch acceleration corresponds to the acceleration information in the position signature. When the punch acceleration and punch signature acceleration information correspond to one another, punch position is then compared to the punch position information in the position signature. If punch position then matches the punch position information within the signature, for example, punch position is within an acceptable position range, a good clinch condition is indicated and clinching continues. If the punch position does not correspond to the punch position information within the position signature when the punch acceleration corresponds with the punch acceleration information within the position signature, a fault condition is indicated.

It is to be appreciated that the use of punch position and punch acceleration within the position signature is a preferred implementation of this alternative embodiment of the present invention. Of course, other information, such as other time derivatives of punch position, or any other desired information may be included within the position signature.

That is, the term "position signature" as used herein means any descriptive information relating to punch and die assembly operating parameters during clinching. The position signature may include position information, information related to one or more position time derivatives, corresponding loading information, or any combination thereof, as desired based on the desired implementation of the present invention and sensor selection (position only, position and load, etc.).

It is to be appreciated that embodiments of the present invention allow control of clinching operations with clinch control logic and a position sensor, and an optional load sensor. Further, it is to be appreciated that position sensor embodiments, and position sensor and load sensor embodiments of the present invention allow for clinching operation control that immediately halts clinching operation upon fault detection, or alerts an operator of the faulty clinch joint via an indicator light or other suitable indicator, or logs the fault to a fault log that may be accessed by an operator at a later time.

While the best modes for carrying out the invention have been described in detail, those familiar with the art to which this invention relates will recognize various alternative designs and embodiments for practicing the invention as defined by the following claims.

What is claimed is:

1. A clinching station for securing a first workpiece to a second workpiece, the clinching station comprising:
    a punch and die assembly including a punch and a die mounted opposite each other for movement relative to each other along a working axis;
    a position sensor configured to monitor position of the punch relative to the die, and having an output indicative of the position of the punch relative to the die;
    a load sensor configured to monitor loading experienced by the punch and die assembly, and having an output indicative of the punch and die assembly load; and
    a controller having control logic stored therein, the controller receiving the position sensor output and the load sensor output as the punch and the die move over a stroke range toward each other to perform the clinching operation, the control logic being programmed to direct the controller to process the position sensor output and the load sensor output and to generate a fault signal indicative of a fault condition if the punch and die assembly load exceeds a load threshold while the position of the punch relative to the die is outside of a predetermined acceptable position range for initiating clinching of the first workpiece to the second workpiece.

2. The clinching station of claim 1 further comprising:
    a piston and cylinder assembly drivingly connected to the punch and die assembly such that actuation of the cylinder drives the punch toward the die.

3. The clinching station of claim 2 wherein the load sensor further comprises:
    a pressure sensor coupled to the piston and cylinder assembly to monitor cylinder actuation pressure during clinching station operation.

4. The clinching station of claim 1 wherein the load sensor further comprises:
    a load cell configured to receive a component of the punch and die assembly load during clinching station operation.

5. The clinching station of claim 1 wherein the position sensor further comprises:
    a linear displacement transducer configured to sense the position of the punch relative to the die.

6. The clinching station of claim 1 wherein the control logic is further programmed to direct the controller to generate a no-part fault signal indicative of a no-part fault condition if the position of the punch relative to the die exceeds the acceptable position range for initiating clinching of the first workpiece to the second workpiece without the load exceeding the load threshold.

7. A clinching station for securing a first workpiece to a second workpiece, the clinching station comprising:
    a punch and die assembly including a punch and a die mounted opposite each other for movement relative to each other along a working axis;
    a position sensor configured to monitor position of the punch relative to the die, and having an output indicative of the position of the punch relative to the die;
    a load sensor configured to monitor loading experienced by the punch and die assembly, and having an output indicative of the punch and die assembly load; and
    a controller having control logic stored therein, the controller receiving the position sensor output and the load sensor output as the punch and the die move over a stroke range toward each other to perform the clinching operation, the control logic being programmed to direct the controller to process the position sensor output, the load sensor output, a load threshold, and a predetermined acceptable position range for initiating clinching of the first workpiece to the second workpiece and to generate a clinching operation status signal.

8. The clinching station of claim 7 further comprising:
    a piston and cylinder assembly drivingly connected to the punch and die assembly such that actuation of the cylinder drives the punch toward the die.

9. The clinching station of claim 8 wherein the load sensor further comprises:
    a pressure sensor coupled to the piston and cylinder assembly to monitor cylinder actuation pressure during clinching station operation.

10. The clinching station of claim 7 wherein the load sensor further comprises:
    a load cell configured to receive a component of the punch and die assembly load during clinching station operation.

11. The clinching station of claim 7 wherein the position sensor further comprises:
    a linear displacement transducer configured to sense the position of the punch relative to the die.

12. The clinching station of claim 7 wherein the control logic is further programmed to direct the controller to generate a no-part fault signal indicative of a no-part fault condition if the position of the punch relative to the die exceeds the acceptable position range for initiating clinching of the first workpiece to the second workpiece without the load exceeding the load threshold.

13. The clinching station of claim 7 wherein the control logic is further programmed to direct the controller to generate a part fault signal indicative of a part fault condition if the punch and die assembly load exceeds the load threshold while the position of the punch relative to the die is outside of the predetermined acceptable position range for initiating clinching of the first workpiece to the second workpiece.

14. A method of clinching a first workpiece to a second workpiece with a punch and die assembly including a punch and a die mounted opposite each other for movement relative to each other along a working axis, the method comprising:

determining an acceptable position range for initiating clinching of the first workpiece to the second workpiece;

monitoring the position of the punch relative to the die;

determining a load threshold wherein loads experienced by the punch and die assembly exceeding the load threshold cause clinching of the first workpiece to the second workpiece;

monitoring the loading experienced by the punch and die assembly; and processing the position of the punch relative to the die as the punch and the die move over a stroke range toward each other to perform the clinching operation, the loading experienced by the punch and die assembly, the load threshold, and the acceptable position range for initiating clinching to generate a clinching operation status signal.

15. A method of clinching a first workpiece to a second workpiece with a punch and die assembly including a punch and a die mounted opposite each other for movement relative to each other along a working axis, the method comprising:

determining an acceptable position range for initiating clinching of the first workpiece to the second workpiece;

monitoring the position of the punch relative to the die;

determining a load threshold wherein loads experienced by the punch and die assembly exceeding the load threshold cause clinching of the first workpiece to the second workpiece;

monitoring the loading experienced by the punch and die assembly;

processing the position of the punch relative to the die, the loading experienced by the punch and die assembly, the load threshold, and the acceptable position range for initiating clinching to generate a clinching operation status signal; and generating a no-part fault signal indicative of a no-part fault condition if the position of the punch relative to the die exceeds the acceptable position range for initiating clinching of the first workpiece to the second workpiece without the load exceeding the load threshold.

16. A method of clinching a first workpiece to a second workpiece with a punch and die assembly including a punch and a die mounted opposite each other for movement relative to each other along a working axis, the method comprising:

determining an acceptable position range for initiating clinching of the first workpiece to the second workpiece;

monitoring the position of the punch relative to the die;

determining a load threshold wherein loads experienced by the punch and die assembly exceeding the load threshold cause clinching of the first workpiece to the second workpiece;

monitoring the loading experienced by the punch and die assembly;

processing the position of the punch relative to the die, the loading experienced by the punch and die assembly, the load threshold, and the acceptable position range for initiating clinching to generate a clinching operation status signal; and generating a part fault signal indicative of a part fault condition if the punch and die assembly load exceeds the load threshold while the position of the punch relative to the die is outside of the predetermined acceptable position range for initiating clinching of the first workpiece to the second workpiece.

17. A clinching station for securing a first workpiece to a second workpiece, the clinching station comprising:

a punch and die assembly including a punch and a die mounted opposite each other for movement relative to each other along a working axis;

a position sensor configured to monitor position of the punch relative to the die, and having an output indicative of the position of the punch relative to the die; and a controller having control logic receiving the position sensor output as the punch and the die move over a stroke range toward each other to perform the clinching operation and the control logic being programmed to direct the controller to process the position sensor output and an established position signature for an acceptable clinching operation and to generate a clinching operation status signal.

18. The clinching station of claim 17 wherein the control logic is programmed to direct the controller to compare the position sensor output at maximum punch travel during clinching to the position signature to generate the clinching operation status signal such that a good clinch condition is indicated when the maximum punch travel corresponds to the position signature, and a fault condition is indicated when the maximum punch travel does not correspond to the position signature.

19. The clinching station of claim 18 wherein the control logic is programmed direct to the controller to indicate a no nut fault when the position sensor output at maximum punch travel exceeds an acceptable maximum punch travel range defined by the position signature, and to indicate an extra nut fault when the position sensor output at maximum punch travel precedes the acceptable punch travel range.

20. The clinching station of claim 17 wherein the control logic is further programed to direct the controller to determine at least one time derivative of the punch position relative to the die, to process the position sensor output, the at least one time derivative, and the position signature to generate the clinching operation status signal such that a good clinch condition is indicated when the position sensor output and the at least one time derivative correspond to the position signature, and a fault condition is indicated when the position sensor output and the at least one time derivative do not correspond to the position signature.

21. The clinching station of claim 20 wherein the at least one time derivative includes acceleration of the punch relative to the die.

22. The clinching station of claim 17 further comprising:

a load sensor configured to monitor loading experienced by the punch and die assembly, and having an output indicative of the punch and die assembly load, wherein the position signature includes position information and corresponding loading information.

23. A method of clinching a first workpiece to a second workpiece with a punch and die assembly including a punch and a die mounted opposite each other for movement relative to each other along a working axis, the method comprising:

establishing a position signature for the punch relative to the die during an acceptable clinching operation;

monitoring the position of the punch relative to the die during a clinching operation; and processing the position of the punch relative to the die, and the position signature to generate a clinching operation status condition.

24. The method of claim 23 further comprising:
monitoring loading experienced by the punch and die assembly, wherein the position signature includes position information and corresponding loading information.

25. A method of clinching a first workpiece to a second workpiece with a punch and die assembly including a punch and a die mounted opposite each other for movement relative to each other along a working axis, the method comprising:
establishing a position signature for the punch relative to the die during an acceptable clinching operation;
monitoring the position of the punch relative to the die during a clinching operation;
processing the position of the punch relative to the die, and the position signature to generate a clinching operation status condition;
comparing the position of the punch relative to the die at maximum punch travel to the position signature; and
generating the clinching operation status signal such that a good clinch condition is indicated when the maximum punch travel corresponds to the position signature, and a fault condition is indicated when the maximum punch travel does not correspond to the position signature.

26. The method of claim 25 wherein generating further comprises:
indicating a no nut fault when the position of the punch relative to the die at maximum punch travel exceeds an acceptable maximum punch travel range defined by the position signature, and indicating an extra nut fault when the position of the punch relative to the die at maximum punch travel precedes the acceptable punch travel range.

27. A method of clinching a first workpiece to a second workpiece with a punch and die assembly including a punch and a die mounted opposite each other for movement relative to each other along a working axis, the method comprising:
establishing a position signature for the punch relative to the die during an acceptable clinching operation;
monitoring the position of the punch relative to the die during a clinching operation;
processing the position of the punch relative to the die, and the position signature to generate a clinching operation status condition;
processing the position of the punch relative to the die to determine at least one time derivative of the punch position relative to the die; and
processing the position of the punch relative to the die, the at least one time derivative, and the position signature to generate the clinching operation status signal such that a good clinch condition is indicated when the punch position and the at least one time derivative correspond to the position signature, and a fault condition is indicated when the punch position and the at least one time derivative do not correspond to the position signature.

28. The method of claim 27 wherein the at least one time derivative includes acceleration of the punch relative to the die.

* * * * *

UNITED STATES PATENT AND TRADEMARK OFFICE
CERTIFICATE OF CORRECTION

PATENT NO. : 6,067,696
DATED : May 30, 2000
INVENTOR(S) : Dimitrios G. Cecil

It is certified that error appears in the above-identified patent and that said Letters Patent is hereby corrected as shown below:

The sheets of drawings, figures 1-9, should be deleted to appear as per attached figures.

Signed and Sealed this

Eleventh Day of December, 2001

*Attest:*

NICHOLAS P. GODICI
*Attesting Officer*     Acting Director of the United States Patent and Trademark Office